United States Patent
Works

(10) Patent No.: US 6,969,090 B1
(45) Date of Patent: Nov. 29, 2005

(54) SYSTEM FOR MOUNTING HITCHES TO HYDROFORMED FRAMES

(75) Inventor: Joseph W. Works, Humboldt, KS (US)

(73) Assignee: B&W Custom Truck Beds, Inc., Humboldt, KS (US)

( * ) Notice: Subject to any disclaimer, the term of this patent is extended or adjusted under 35 U.S.C. 154(b) by 0 days.

(21) Appl. No.: 10/631,227

(22) Filed: Jul. 31, 2003

(51) Int. Cl.[7] .............................................. B60D 1/00
(52) U.S. Cl. ...................... 280/901; 280/407; 280/430; 280/438.1; 280/491.5
(58) Field of Search ............................... 280/901, 407, 280/430, 438.1

(56) References Cited

U.S. PATENT DOCUMENTS

| | | | | |
|---|---|---|---|---|
| 4,429,892 A | * | 2/1984 | Frampton et al. | 280/407 |
| 5,016,898 A | | 5/1991 | Works et al. | |
| 5,246,244 A | * | 9/1993 | Colibert | 280/495 |
| 5,513,869 A | * | 5/1996 | Putnam | 280/415.1 |
| 5,557,961 A | * | 9/1996 | Ni et al. | 72/61 |
| 6,158,761 A | * | 12/2000 | King | 280/495 |
| 6,409,202 B1 | * | 6/2002 | Putnam | 280/495 |
| 6,485,045 B1 | * | 11/2002 | King | 280/417.1 |
| 6,533,308 B1 | * | 3/2003 | Tambornino | 280/491.1 |

OTHER PUBLICATIONS

Turnover Ball Gooseneck Hitch Installation Instructions Model 1062R, hitch shown therein on sale prior to July 31, 2002.
Turnover Ball Gooseneck Hitch Model 1302R Dodge 2002, hitch shown therein on sale prior to Jul. 31, 2002.

* cited by examiner

*Primary Examiner*—Lesley D. Morris
*Assistant Examiner*—Paul Royal, Jr.
(74) *Attorney, Agent, or Firm*—Erickson & Kleypas, L.L.C.

(57) ABSTRACT

A hitch structure for connection between a pair of elongated, laterally spaced hydroformed frame members of a vehicle chassis having preformed apertures formed therein. The hitch structure comprises a hitch base adapted to receive a hitch ball member, a pair of side plates connected respectively to opposite ends of said hitch base, a pin sized, positioned, and oriented on each of the side plates to enable reception of the pin member in the preformed aperture of an associated hydroformed frame member, and a pair of clamp members on each side plate to clamp the side plate with an associated frame member at such a location as to position the pin member in alignment with the associated preformed aperture to thereby secure said hitch base in transverse relation between the frame members.

22 Claims, 2 Drawing Sheets

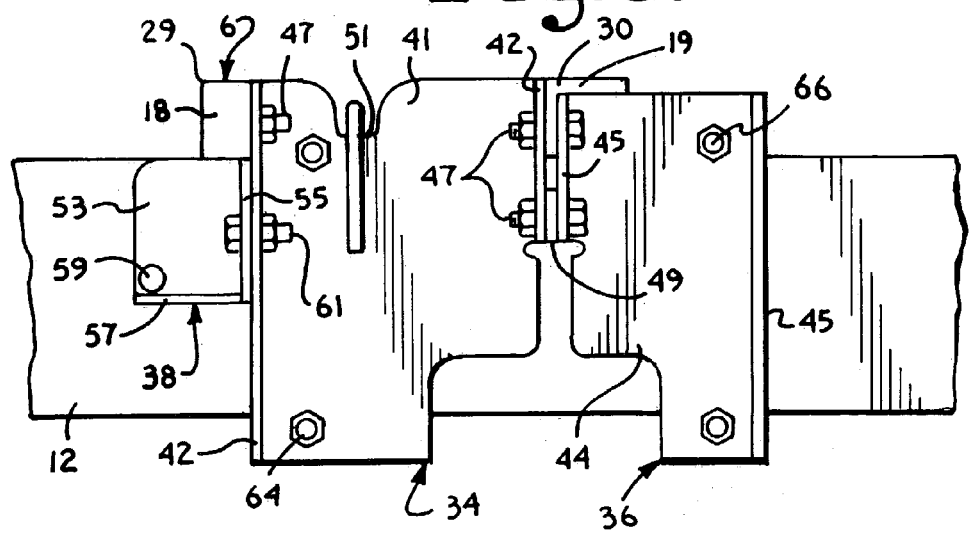
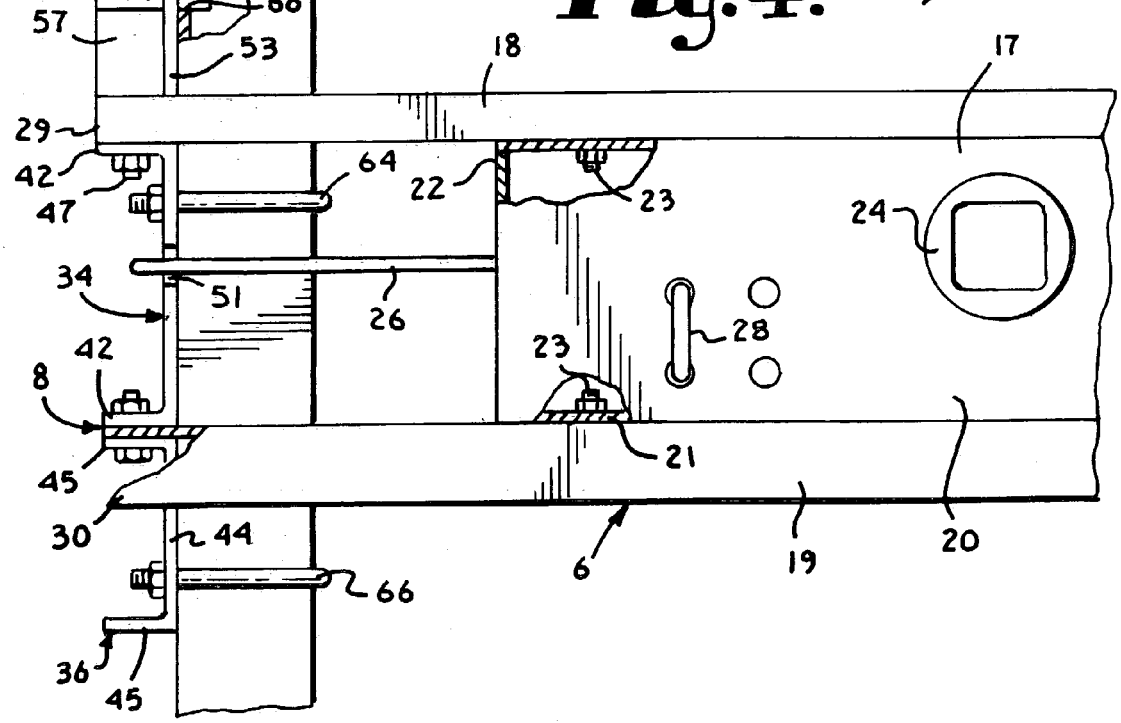

SYSTEM FOR MOUNTING HITCHES TO HYDROFORMED FRAMES

BACKGROUND OF THE INVENTION

Conventional trailer hitches for light weight automobile and truck type vehicles normally include a hitch plate or bar which is welded adjacent the rear bumper of the vehicle or on the rear bumper of the vehicle and to which a hitch ball may be selectively secured. There are a number of conventional sizes of hitch balls which may be utilized depending upon the hitch assembly which is incorporated with the trailer that is to be towed. One shortcoming in such conventional rear end hitch assemblies is that the amount of weight which may be pulled by the vehicle is limited by the weight or force of the load which acts vertically on the hitch assembly since the hitch ball is located at a point which is spaced rearward from the rear axle of the vehicle. With this type of assembly, an increased moment of force is induced about the rear axle thereby limiting the load which may be safely pulled by the vehicle without adversely effecting the weight distribution to the front wheels of the vehicle. Reducing the weight distribution on the front wheels can adversely affect steering and braking of the vehicle and can also affect traction in front wheel drive vehicles.

In order to overcome the foregoing problem, a system for mounting trailer hitches was developed which has been referred to as a "fifth wheel" type trailer hitch. The fifth wheel trailer hitch includes a hitch ball which is mounted over or slightly forward of the rear axle of a flat bed type vehicle and particularly pickup trucks. By positioning the hitch ball above or forward of the rear axle of the vehicle, the weight which the vehicle can tow is significantly increased over vehicles having the rear end type hitch assemblies. In order to allow the trailing vehicle to be connected to a fifth wheel type hitch, a "gooseneck" type extension is utilized on the towing arm of the trailing vehicle. The gooseneck is generally somewhat curved with the hitch portion being disposed at its forward end, with a central portion extending upwardly and over the rear of the pulling vehicle.

Although fifth wheel trailer hitch assemblies provide the added advantage of allowing a vehicle to safely tow a greater weight load, the placement of the trailer hitch ball along the cargo bed of the towing vehicle can adversely affect the normal use of the cargo bed when the vehicle is not being utilized to pull a trailer. In order to overcome this disadvantage, there have been a number of structures developed for allowing the trailer hitch ball to be either selectively removed, retracted, or reversed from its use position relative to the cargo bed of the towing vehicle.

Pickup trucks are typically constructed as a separate frame or chassis and body, the frame generally being formed by elongated beam type members and cross members from stock such as I-beams, tubes, or the like. More recently, pickup truck frames have been formed using "hydroforming" techniques. In a hydroforming process, an enclosed shape, such as tubular stock, is filled with a fluid, sealed at the opposite ends, then cold formed in a die to a more complex shape, including bends. The fluid prevents collapsing of the tube and maintains a desired cross sectional shape of the resulting tubular product. After forming, the fluid is drained from the hydroformed beam. For more details describing hydroforming processes, see U.S. Pat. Nos. 1,943,560 or 5,339,667.

Hydroforming techniques typically result in a structure of a desired shape which has a desired strength with a lighter weight, for a given volume of metal. This result is achieved in part by producing a frame member with reduced wall thickness. It has been customary to attach hitch assemblies to truck frame members by drilling holes in the walls or web of existing chassis frame members, positioning a hitch assembly mounting plate next to the frame member and threading a bolt through an opening in the mounting plate aligned with the hole bored into the chassis frame member. A nut on the bolt is then drawn down tight.

Due to the reduced wall thickness of hydroformed frame members, warranties covering hydroformed products, such as vehicle frames, often do not allow drilling additional holes or welding to such frames, beyond those that are originally designed for by the manufacturer. Additionally, there are limits to clamping pressures which may be applied to such hydroformed frame members particularly clamping forces applied across or perpendicular to the walls or web of the hydroformed frame members. For example, the forces exerted on the wall of a hydroformed frame member by the head of a bolt or a nut drawn toward each other when tightening a nut to bolt the hitch assembly base to the frame member may be sufficient to collapse the wall of the frame member thereby weakening the frame member. This presents problems in connecting conventional fifth wheel hitch structures to pickup trucks incorporating hydroformed frame members. What is needed is a fifth wheel hitch structure which can be securely attached to hydroformed frame members without the use of welds, additionally drilled holes, or excessive clamping pressures.

SUMMARY OF THE INVENTION

The present invention provides a fifth wheel hitch structure especially adapted for connection to hydroformed frame members of a pickup truck chassis. The hitch structure includes a center section within which a reversible hitch ball member is mounted, front and rear cross members connected to the center section, left and right side plate assemblies connected to the outer ends of the cross members, and sets of longitudinally spaced clamp members, such as U-bolts, which connect the side plate assemblies to left and right longitudinal chassis frame members or rails, which are manufactured as hydroformed tubular beams. In a preferred embodiment of the present invention, each side plate assembly includes a pin bracket having a pin member which is received in a preformed hole in an outer wall of each chassis rail. The pin brackets, in cooperation with the clamp members, fix the structure against vertical movement, lateral movement across the chassis members, and longitudinal movement along the chassis members.

The center section and cross members form an upper assembly to which the side plate assemblies are connected. The center section is an inverted shallow channel member with the ends closed for reinforcement. A hitch ball receiving socket is mounted in the center section. The hitch ball member is releasably retained in the hitch socket and is preferably removable and reversible to avoid interference with items carried in the pickup bed when the hitch ball is not needed. The front and rear cross members are connected, as by bolts, to front and rear flanges of the center section and are sized to extend past the chassis members on opposite sides of the truck. The center section also preferably has safety chain brackets mounted thereon to provide for the connection of safety chains from the trailer tongue to the hitch structure. The safety chain brackets may be U-bolts in combination with springs which resiliently retract the U-bolts when not needed.

Each side plate assembly includes a pin bracket, a front side plate, and a rear side plate. In the preferred embodiment, the front side plate is connected to the outer ends of the cross members. The rear side plate is connected to the rear cross member and to a rear end of the front side plate. The pin bracket is connected to a front end of the front side plate.

Each side plate assembly also includes at least two clamp members, including one clamp member connected to the front side plate and another connected to the rear side plate. The clamp members are preferably wide U-bolts sized to fit around the chassis members with which they will be engaged. Alternatively, other types of clamp members could be employed. The pairs of clamp members distribute the forces or loads transferred through the hitch ball from the trailer tongue to the members of the chassis.

In some cases, in order to increase the local strength of hydroformed members, the cross section of an end of one member is reduced and telescoped into another member and welded in place. The present invention takes advantage of such welded telescope joints by positioning the clamp members against such areas of reduced cross section or welds to thereby provide additional resistance to sliding of the hitch structure along the chassis members to which the structure is attached.

Various objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 3 is a further enlarged fragmentary side elevational view of the hitch structure secured to hydroformed frame members and illustrates details of a side plate assembly thereof.

FIG. 4 is a fragmentary top plan view of the hitch structure of the present invention with portions removed to illustrate further details of the side plate assembly and a hitch base assembly of the hitch structure.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
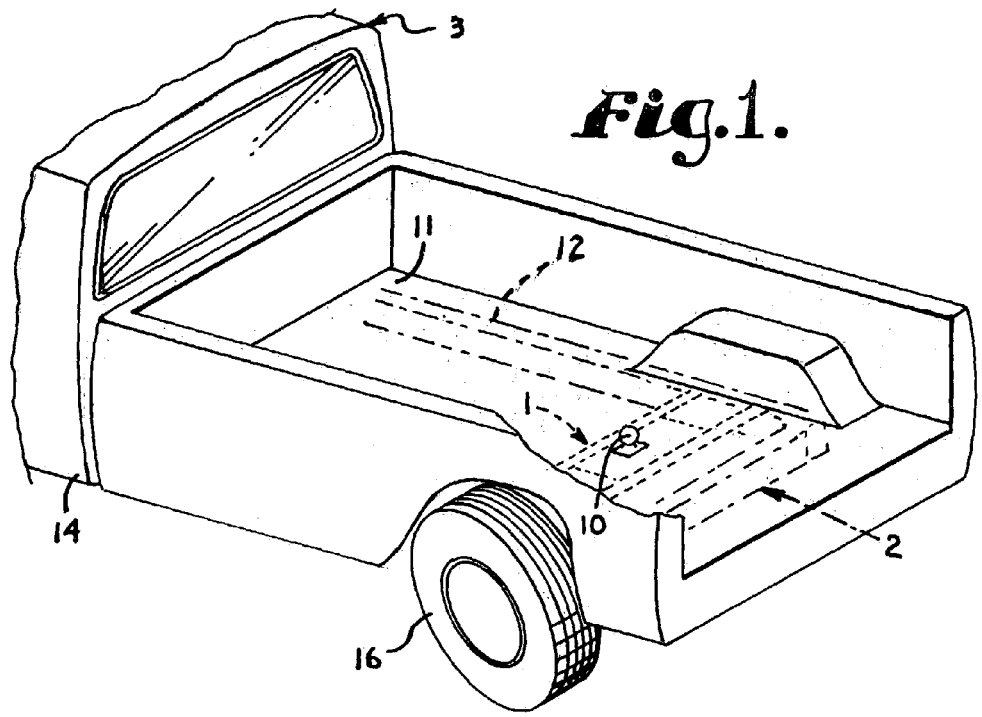
FIG. 1 is a fragmentary perspective view of a pickup truck incorporating a fifth wheel hitch structure for hydroformed chassis which embodies the present invention.
Figure 2:
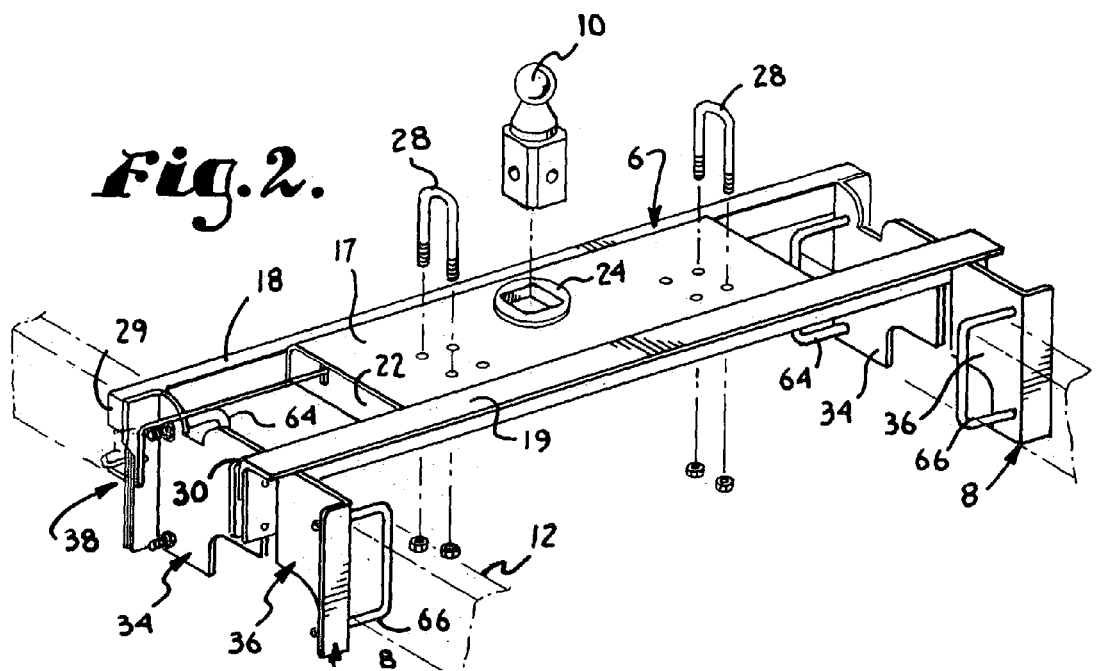
FIG. 2 is an enlarged exploded perspective view of the hitch structure with the hydroformed frame members to which it is attached shown in phantom lines.

Referring to the drawings in more detail, the reference numeral 1 generally designates a fifth wheel hitch structure for a hydroformed chassis 2 of a vehicle, such as a pickup truck 3. As best seen in FIG. 2, the hitch structure 1 generally includes an upper hitch base assembly 6 and side plate assemblies 8 mounted at opposite ends of the hitch base assembly 6. The hitch base assembly 6 supports a hitch ball member 10 by which a fifth wheel trailer (not shown) is hitched to the truck 3. As shown in FIG. 1, the hitch ball 10 extends through an opening in a bed 11 of the pickup truck 3. Referring to FIGS. 2–4, the side plate assemblies 8 connect the hitch base assembly 6 to the hydroformed rails or members 12 of the chassis 2.

The rails or longitudinal members 12 of the vehicle chassis or frame 2 extend in a front to back relationship on the pickup truck 3 and support a body 14 of the truck 3, including the pickup bed 11 as generally shown in FIG. 1. The chassis 2 also supports axles (not shown) on which wheels 16 are mounted. The hitch structure 1 is particularly adapted for connection to a chassis-2 on which at least the longitudinal members 12 are manufactured by a hydroforming process. However, other members of the chassis 2 may also be manufactured by such hydroforming processes.

Referring to FIGS. 2 and 4, the hitch base assembly 6 includes a hitch base member 17 having a front cross member 18 and a rear cross member 19 secured thereto. The illustrated hitch base member 17 is an inverted channel shaped member formed by a web 20 and, depending flanges 21 (FIG. 4) and with the ends reinforced by end plates 22 (one of which is shown in FIG. 2). The cross members 18 and 19 are secured to the flanges 21 of the hitch base member 21, as by sets 23 of bolts or threaded studs and nuts.

A hitch ball socket 24 is mounted through the web 20 of the hitch base member 17 and is adapted to receive the hitch ball member or hitch member 10 therein. The hitch ball member 10 is removable and invertible in the socket 24 to present a low profile within the truck bed 11 when the hitch ball 10 is not needed. The hitch ball socket 24 shown includes a hitch ball retaining mechanism (not detailed herein) which retains the hitch ball member 10 within the socket 24, except when released by pulling outwardly on a hitch release handle 26. Further details of a hitch ball, socket, and release mechanism which are appropriate for use in the hitch structure 1 of the present invention can be found in U.S. Pat. No. 5,016,898. However, it is to be understood that the structure for mounting a hitch base to a hydroformed frame is adapted for use with a wide variety hitches having a hitch ball adapted to be secured to a hitch base mounted below the floor or bed 11 of a pickup truck 3 or the like.

The hitch base assembly 6 preferably includes safety chain brackets 28 which are mounted on the web 20 of the hitch base member 17. The illustrated brackets 28 are formed by inverted U-bolts which extend through the web 20 and the bed 11 of the pickup truck 3. The brackets 28 are resiliently retained in a retracted condition and may be pulled out for connection of safety chains (not shown) thereto. Such safety chains connect between the tongue of a hitched trailer and prevent the trailer from being completely released from the towing pickup 3 if the tongue should disengage from the hitch ball 10.

The illustrated front cross member 18 is a solid bar having a rectangular cross section. The illustrated rear cross member 19 is an angle member with an inverted L-shaped cross section. Alternatively, the cross members 18 and 19 could be other types of members, such as I-shaped members, channels, round or square tubes, or the like. The cross members 18 and 19 are equal in length and extend laterally of the chassis 2 to position respective outer ends 29 and 30 of the members 18 and 19 just to the outside of the hydroformed chassis members 12. As used herein, the hitch base assembly 6, including hitch base 17 and cross members 18 and 19 may be referred to as the hitch base with the ends of the cross members 18 and 19 forming the ends of the hitch base.

Referring to FIGS. 3 and 4, each of the side plate assemblies 8 includes a front side plate member 34, a rear plate member 36, and a pin bracket 38. Although the side plate assemblies 8 are shown as being formed from three separate members or components, it is foreseeable that the side plate assemblies could be formed from a single member or plate or two or more plates. In addition, as used in the claims, the term side plate is intended to include a side plate or side plate assembly whether formed from one or more panels, plates or members.

The illustrated front plate member 34 is a portion of a vertically extending channel member, including a web 41 and flanges 42. Similarly, the rear side plate member 36 is formed of a channel-like member, including a web 44 and flanges 45. The front side plate 34 is secured to the ends 29 and 30 of the front and rear cross members 18 and 19 by fasteners 47, such as sets of threaded studs or bolts and nuts, passing through the flanges 42 of the front side plate 34. The fasteners 47 are also used to secure the rear side plate 36 to the rear cross member 19 and to the front side plate 34. A spacer member 49 (FIG. 4) may be positioned between the flanges 42 and 45 of the front and rear side plates 34 and 36, below the rear cross member 19. The illustrated front side plate 34 has a notch 51 formed in the web 41 thereof to provide clearance for the hitch ball release handle 26 as best seen in FIG. 2. The illustrated pin bracket 38 is an angle member formed by a web 53, an upstanding flange 55, and a lower flange 57. The pin bracket 38 has a cylindrical pin 59 secured thereto, as by welding, and extending inwardly from the web 53 as best seen in FIG. 4. In the embodiment shown, the pin 59 extends through a hole in web 53 of pin bracket 38 and is welded in place. Portions of the pin 59 extend on each side of the web 53. The pin bracket 38 is secured to the front flange 42 of the front side plate 34 by a fastener set 61 which passes through the upstanding flange 55 of the bracket 38.

Although the pin 59 is shown as being circular in cross-section, it is to be understood that the cross-sectional shape of the pin 59 could be varied to correspond to the shape of the preformed opening or hole 68 in the hydroformed frame members 12 into which it is intended to be inserted. For example, the closest preformed opening 68 to the location at which the hitch base assembly 6 is to be mounted could be square or ovate, in which case the selected cross-section of the pin 59 could be square or ovate respectively.

The side plate assemblies 8 are secured to the hydroformed members 12 of the chassis 2 by front and rear clamp members 64 and 66 as shown in FIGS. 2 and 4. The illustrated clamp members 64 and 66 are relatively Wide U-bolts. Alternatively, it is foreseen that other types of clamping devices, which are functionally similar to the illustrated U-bolts, could be employed as the clamp members 64 and 66. Where possible, it is desirable to position the hitch structure 1 so that the clamp members 64 and 66 engage changes in cross sectional area of the members 12 or locations where welds, if any, are present. This prevents potential sliding movement of the hitch structure 1 along the members 12. The pin bracket 38 provides additional resistance to sliding of the structure 1 along the members 12. The pin bracket 38 is dimensioned to align the pin member 59 with a hole 68 which was preformed in an outer wall 70 of the chassis member 12 by the manufacturer of the truck 3.

The use of the clamp members 64 and 66 secures the hitch structure 1 to the hydroformed chassis frame members 12 without drilling into the members 12 or welding thereto. In addition, the clamping forces of the U-bolts 64 and 66 are generally concentrated along and parallel to the upper and lower walls of the frame members 12 which can withstand greater compressive forces than the middle of the sidewalls of the frame members 12 which are more susceptible to collapsing when compressive forces are applied thereto. Additionally, the use of a pair of clamp members 64 and 66 on each side of the structure 1 disperses, to some extent, the trailer draft forces transferred through the hitch ball 10 to the chassis 2 of the truck 3. It is to be understood that while certain forms of the present invention have been illustrated and described herein, it is not to be limited to the specific forms or arrangement of parts described and shown. For example, although the side plate assemblies 8 are shown positioned outside of the respective frame members 12 to which they are attached, it is foreseen that the side plate assemblies 8 could be positioned inside of said frame members 12. Alternatively, a portion of the side plate assemblies 8 might be positioned outside of said frame members 12, such as front and rear side plate members 34 and 36, while a remaining portion of the side plate assemblies might be positioned inside of said frame members, such as pin bracket 38, or vice versa.

As used in the claims it is to be understood that the word connected to, connection or further variations of the word connect are not intended to be limited to a direct connection between parts, but is intended to cover any connection between parts whether direct or indirect, i.e. connected by intermediate parts or elements.

What is claimed is:

1. A hitch structure for connection to an elongated hydroformed frame member of a vehicle chassis having a preformed aperture at a selected location thereon, said hitch structure comprising:
   (a) a hitch base including a hitch member to enable hitching a trailer to said vehicle chassis;
   (b) a side plate connected to said hitch base;
   (c) a pin member rigidly connected to said side plate and cantilevered outwardly therefrom, said pin member being sized, positioned, and oriented to enable reception of said pin member in said preformed aperture; and
   (d) a clamp member engaged with said side plate and clampingly engageable with said hydroformed frame member at such a location as to secure said hitch base to said frame member with said pin member positioned in said preformed aperture of said frame member.

2. The hitch structure as set forth in claim 1 wherein said clamp member is a first clamp member, and including:
   (a) a second clamp member engaged with said side plate and clampingly engageable with said hydroformed frame member, said second clamp member being positioned on said side plate at such a location as to be positioned in longitudinally spaced relation to said first clamp member along said frame member.

3. The hitch structure as set forth in claim 1 wherein:
   (a) said clamp member is a U-bolt sized to fit around said hydroformed frame member.

4. The hitch structure as set forth in claim 1 wherein:
   (a) said hitch base has an outer end which extends over said hydroformed frame member;
   (b) said side plate is positioned adjacent an outer side of said frame member;
   (c) said side plate is connected to said outer end of said hitch base; and
   (d) said clamp member includes a pair of clamp members engaging said side plate and extending inwardly about an inner side of said frame member, said pair of clamp members being positioned in longitudinally spaced relation along said frame member.

5. The hitch structure as set forth in claim 1 wherein:
    (a) said hitch member is separable from said hitch base and is selectively invertible with respect to said hitch base.

6. The hitch structure as set forth in claim 1 wherein said hitch base includes:
    (a) an elongated hitch base member positioned transverse to said chassis, having a front side and a rear side, and having said hitch member engaged therewith;
    (b) an elongated front cross member connected to said front side of said hitch base member;
    (c) an elongated rear cross member connected to said rear side of said hitch base member; and
    (d) said side plate being connected to said hitch base by connection to said front cross member and said rear cross member.

7. The hitch structure as set forth in claim 1 wherein said side plate includes:
    (a) a front side plate member connected to said hitch base;
    (b) a rear side plate member connected to said hitch base;
    (c) said clamp member being a front clamp member and connecting said front side plate member to said frame member; and
    (d) a rear clamp member connecting said rear side plate member to said frame member in longitudinally spaced relation to said front clamp member along said frame member.

8. The hitch structure as set forth in claim 7 wherein said side plate further includes:
    (a) a pin bracket member connected to said front side plate member; and
    (b) said pin member is rigidly connected to and extends outwardly from said pin bracket member.

9. A hitch structure for connection between a pair of laterally spaced hydroformed frame members of a vehicle chassis, a first frame member of said pair of laterally spaced hydroformed frame members having a preformed aperture at a selected location thereon, said structure comprising:
    (a) a hitch base adapted to receive a hitch member to enable hitching a trailer to said vehicle chassis, said hitch base having a pair of laterally spaced ends;
    (b) a pair of clamp members, each clamp member connected to a respective one of said laterally spaced ends of said hitch base and clampingly engageable with a respective one of said hydroformed frame members;
    (d) at least one pin member rigidly connected at a first end thereof to said hitch base and sized, positioned, and oriented to enable reception of a second end of said pin member in said preformed aperture of said first hydroformed frame member to thereby secure said hitch base in transverse relation between said hydroformed frame members.

10. The hitch structure as in claim 9 wherein said at least one pin member comprises a first pin member and said pair of laterally spaced, hydroformed frame members includes a second hydroformed frame member having a preformed aperture therein; said hitch structure includes a second pin member rigidly connected to said hitch base at a first end thereof and sized, positioned, and oriented to enable reception of a second end of said second pin member in said preformed aperture of said second hydroformed frame member.

11. The hitch structure as in claim 9 wherein said clamp members are U-bolts sized to fit around said respective one of said first and second hydroformed frame members.

12. The hitch structure as in claim 9 wherein there are at least two of said pin members and said hitch structure further includes:
    (a) a pair of side plate assemblies connected respectively to said ends of said hitch base, each side plate assembly connecting an associated end of said hitch base to one of said first and second hydroformed frame members by way of an associated one of said clamp members; and
    (b) a pair of pin brackets connected respectively to said side plate assemblies, each pin bracket having one of said pin members rigidly connected thereto to enable reception in a respective preformed aperture in an associated one of said first and second hydroformed frame members.

13. A hitch structure for connection between a pair of elongated, laterally spaced hydroformed frame members of a vehicle chassis, each of said frame members having a preformed aperture at a selected location thereon, said structure comprising:
    (a) a hitch base adapted to receive a hitch member to enable hitching a trailer to said vehicle chassis, said hitch base having a pair of laterally spaced ends;
    (b) a pair of side plates connected respectively to said ends of said hitch base, each of said side plates including a pin member having a first end rigidly connected thereto said pin member being sized, positioned, and oriented to enable reception of a second end of said pin member in said preformed aperture of an associated hydroformed frame member; and
    (c) a pair of clamp members, each clamp member clampingly engageable with a respective one of said side plates with an associated one of said hydroformed frame members at such a location as to position said pin member in the associated preformed aperture to thereby secure said hitch base in transverse relation between said hydroformed frame members.

14. The hitch structure as set forth in claim 13 wherein:
    (a) said hitch base has opposed outer ends which extend outwardly past the respective hydroformed frame members;
    (b) each side plate is positioned adjacent an outer side of an associated frame member and is connected to an associated outer end of said hitch base; and
    (c) each side plate includes a pair of clamp members engaging said side plate with an associated frame member, each pair of clamp members associated with a side plate being positioned in longitudinally spaced relation along the associated frame member.

15. The hitch structure as set forth in claim 13 wherein said hitch base includes:
    (a) an elongated hitch base member positioned transverse to said chassis, having a front side and a rear side, and having said hitch member engaged therewith;
    (b) an elongated front cross member connected to said front side of said hitch base member;
    (c) an elongated rear cross member connected to said rear side of said hitch base member; and
    (d) said side plate being connected to said hitch base by connection to said front cross member and said rear cross member.

16. The hitch structure as set forth in claim 13 wherein each side plate includes:
    (a) a front side plate member connected to said hitch base;
    (b) a rear side plate member connected to said hitch base;
    (c) each side plate including a front clamp member connecting said front side plate member to an associated frame member and a rear clamp member connecting said rear side plate member to said associated frame member in longitudinally spaced relation to said front clamp member along said associated frame member.

17. The hitch structure as set forth in claim 16 wherein each frame member has a preformed aperture at a selected location thereon, and each of said side plates further including:
   (a) a pin bracket member connected to an associated front side plate member;
   (b) said pin bracket member including a pin member sized, positioned, and oriented to enable reception of said pin member in said preformed aperture of an associated frame member; and
   (c) each set of a front plate member and a rear side plate member being clampingly engaged with said associated frame member at such a location as to position said pin member in alignment with said preformed aperture of said associated frame member.

18. The hitch structure as set forth in claim 13 wherein:
   (a) each of said clamp members is a U-bolt sized to fit around an associated one of said hydroformed frame members.

19. A hitch structure for connection between a pair of elongated, laterally spaced hydroformed frame members of a vehicle chassis, each of said frame members having a preformed aperture at a selected location thereon, said structure comprising:
   (a) a hitch base adapted to receive a hitch member to enable hitching a trailer to said vehicle chassis, said hitch base including:
      (1) an elongated hitch base member positioned transverse to said chassis, having a front side and a rear side, and having said hitch member engaged therewith;
      (2) an elongated front cross member connected to said front side of said hitch base member and having opposite ends; and
      (3) an elongated rear cross member connected to said rear side of said hitch base member and having opposite ends;
   (b) a pair of side plates connected to respective sets of opposite ends of said front and rear cross members, each side plate including:
      (1) a front side plate member and a rear side plate member connected to said hitch base, said front and rear side plates connected to one another; and
      (2) a pin bracket member connected to said front side plate member and including a pin member sized, positioned, and oriented to enable reception of said pin member in said preformed aperture of an associated one of said frame members;
   (c) a pair of clamp members associated with each of said side plates, each pair of clamp members including a front clamp member and a rear clamp member, said front clamp member being engaged with an associated front side plate member and said rear clamp member being engaged with an associated rear side plate member, each pair of a front and a rear clamp member clampingly engaging a respective one of said side plates with an associated one of said frame members at such a location as to position said pin member in the associated preformed aperture, and said clamp members associated with each side plate engaging the associated frame member in spaced relation along the associated frame member to thereby secure said hitch base in transverse relation between said frame members; and
   (d) each of said clamp members being a U-bolt sized to fit around an associated one of said hydroformed frame members.

20. A hitch structure for connection to an elongated hydroformed frame member of a vehicle chassis and having a preformed aperture at a selected location thereon, said hitch structure comprising:
   (a) a hitch base including a hitch member to enable hitching a trailer to said vehicle chassis;
   (b) a side plate including:
      (i) a front side plate member and a rear side plate member, each of said side plate members being connected to said hitch base;
      (ii) a pin bracket member connected to said front side plate member and including a pin member sized, positioned, and oriented to enable reception of said pin member in said preformed aperture of said frame member;
   (c) a front clamp member engaged with said front side plate member and clampingly engaging said hydroformed frame member at such a location as to secure said hitch base to said frame member; and
   (d) a rear clamp member connecting said rear side plate member to said frame member in longitudinally spaced relation to said front clamp member along said frame member, wherein
   (e) said front and rear side plate members are clampingly engaged with said frame member at such a location as to position said pin member in alignment with said preformed aperture of said frame member.

21. A hitch structure for connection between a pair of laterally spaced hydroformed frame members of a vehicle chassis, a first frame member of said pair of laterally spaced hydroformed frame members having a preformed aperture at a selected location thereon, said structure comprising:
   (a) a hitch base adapted to receive a hitch member to enable hitching a trailer to said vehicle chassis, said hitch base having a pair of laterally spaced ends;
   (b) a pair of side plate assemblies connected respectively to said ends of said hitch base;
   (c) a pair of pin brackets connected respectively to said side plate assemblies, each pin bracket having a pin member positioned thereon to enable reception in a respective preformed aperture in an associated one of said first and second hydroformed frame members to thereby secure said hitch base in transverse relation between said hydroformed frame members;
   (b) a pair of clamp members, each clamp member connected to a respective one of said side plate assemblies and clampingly engaging a respective one of said hydroformed frame members.

22. A hitch structure for connection between a pair of elongated, laterally spaced hydroformed frame members of a vehicle chassis, each of said frame members having a preformed aperture at a selected location thereon, said structure comprising:
   (a) a hitch base adapted to receive a hitch member to enable hitching a trailer to said vehicle chassis, said hitch base having a pair of laterally spaced ends;
   (b) a pair of side plates connected respectively to said ends of said hitch base, each of said side plates including:
      (i) a front side plate member connected to said hitch base;

(ii) a rear side plate member connected to said hitch base;
(iii) a pin bracket member connected to said front side plate member, said pin bracket member including a pin member sized, positioned, and oriented to enable reception of said pin member in said preformed aperture of an associated one of said hydroformed frame members;
(iv) a front clamp member connecting said front side plate member to said associated frame member; and
(v) a rear clamp member connecting said rear side plate member to said associated frame member in longitudinally spaced relation to said front clamp member along said associated frame member; wherein:
(c) each said clamp member clampingly engages a respective one of said side plates with an associated one of said hydroformed frame members at such a location as to position said pin member in the associated preformed aperture to thereby secure said hitch base in transverse relation between said hydroformed frame members.

* * * * *